July 1, 1930. J. COLLINS 1,769,334
GANG PLOW
Filed Jan. 31, 1928 3 Sheets-Sheet 3
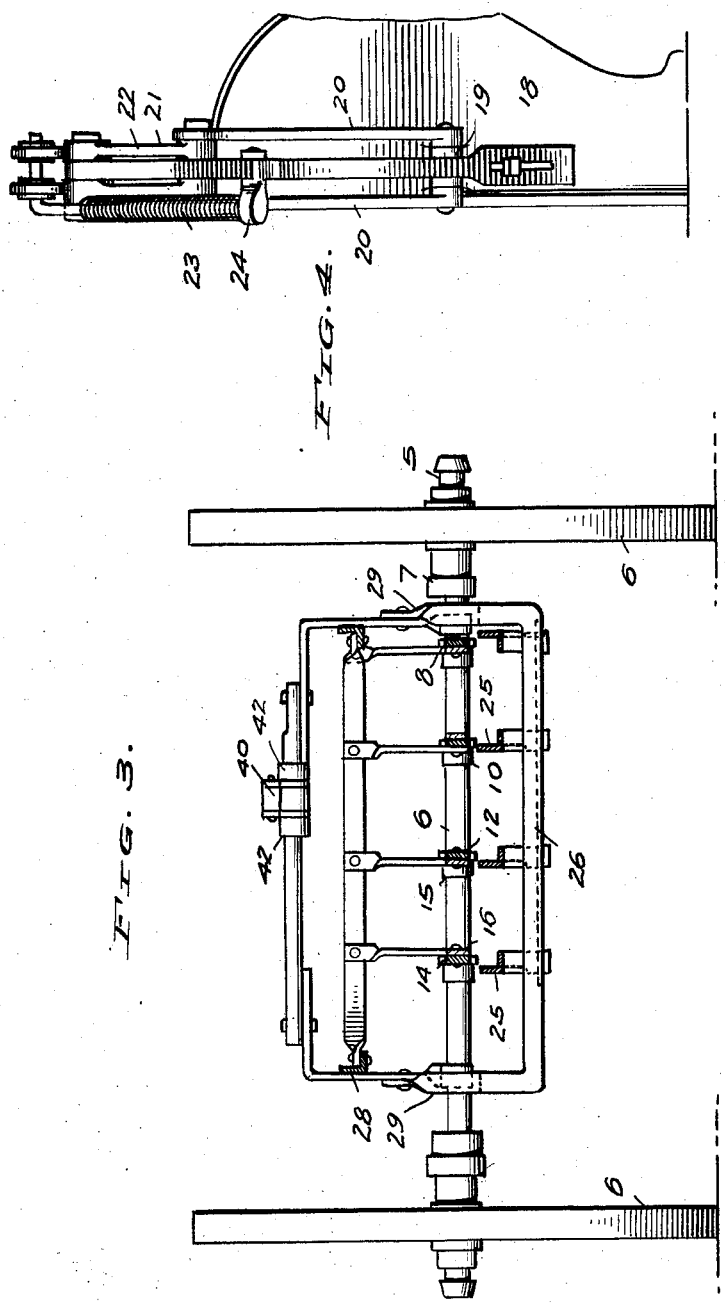
Inventor
John Collins Patented July 1, 1930

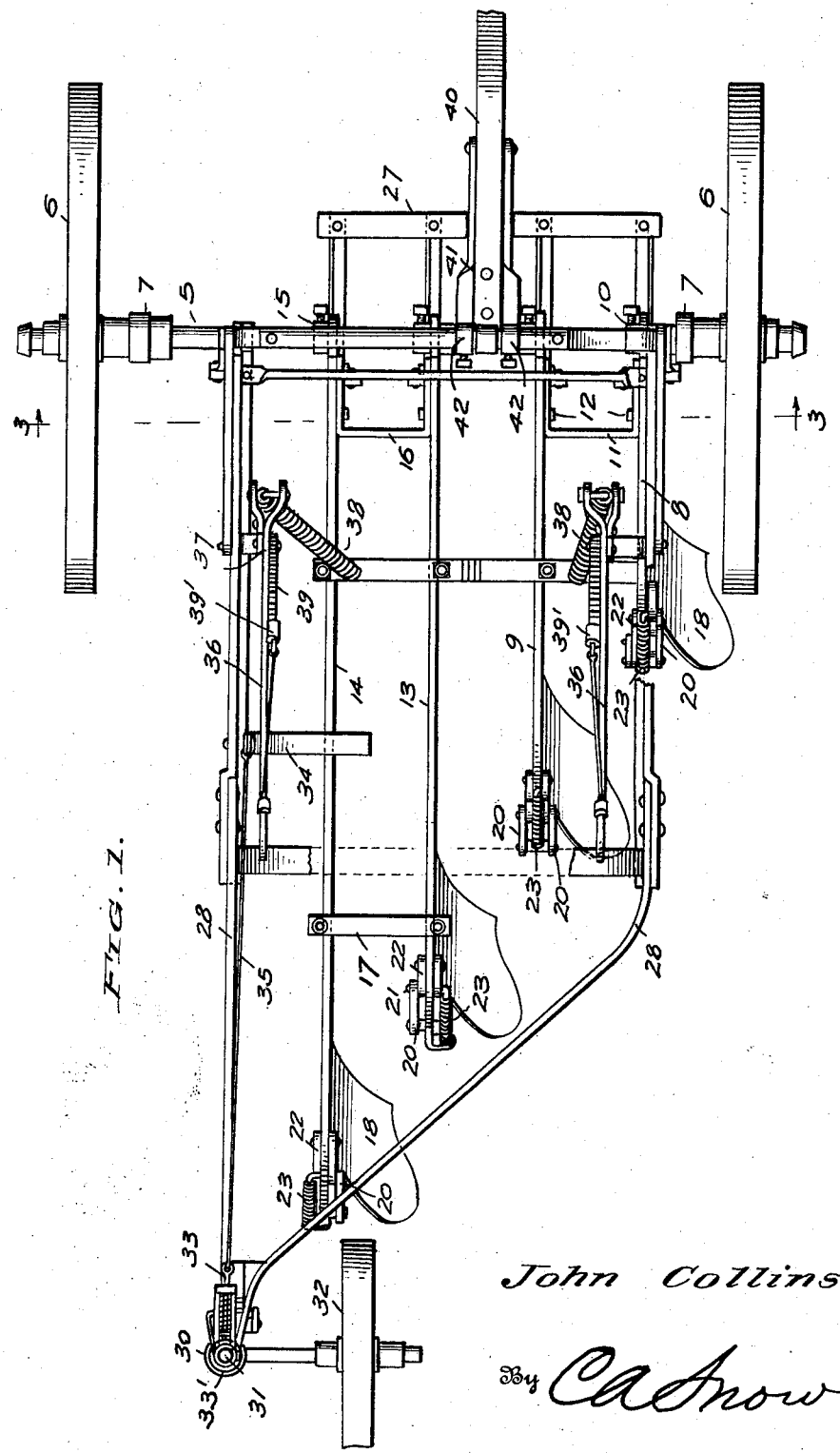

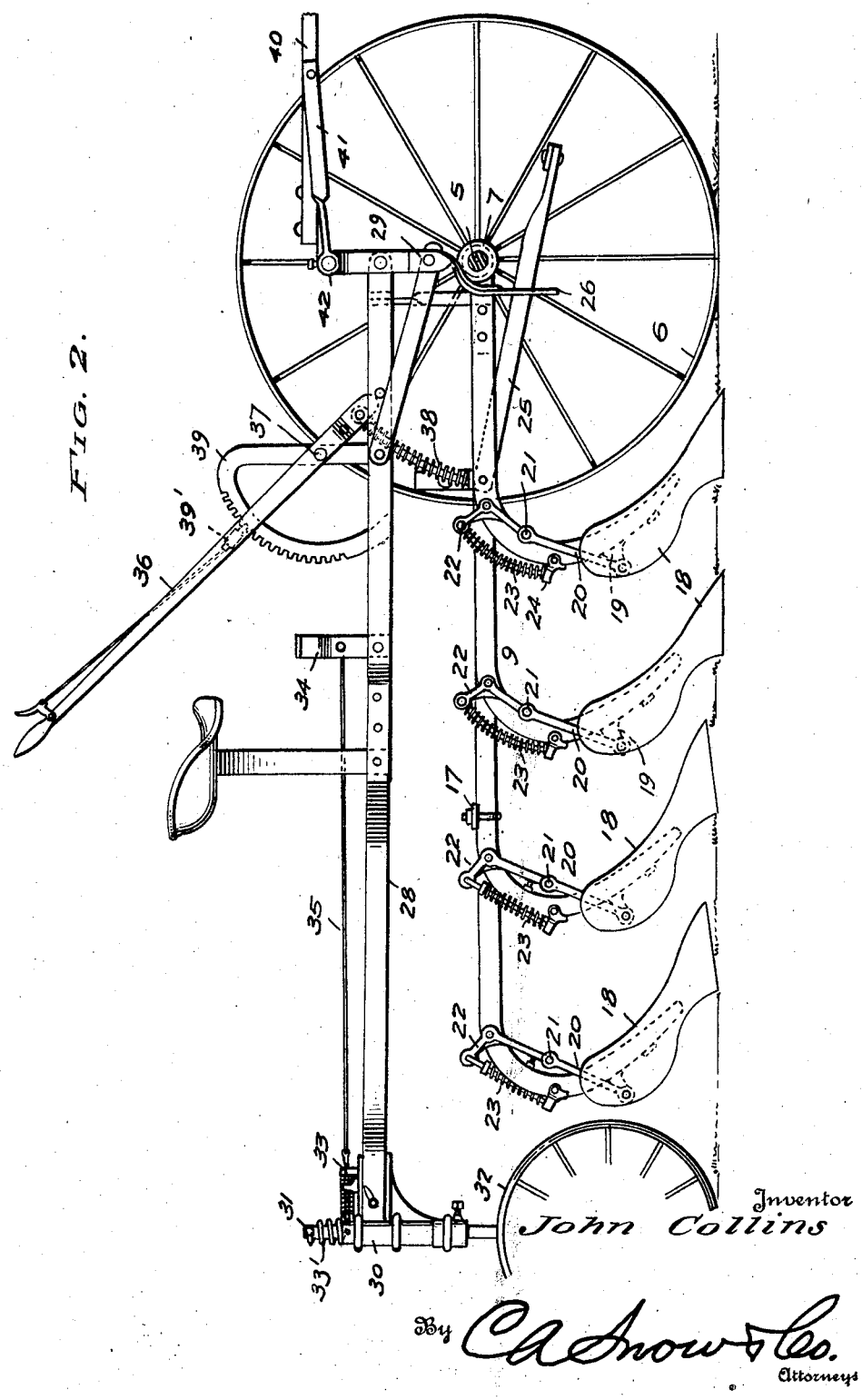

1,769,334

UNITED STATES PATENT OFFICE

JOHN COLLINS, OF VERNON, TEXAS, ASSIGNOR OF FORTY-NINE ONE-HUNDREDTHS TO CHARLIE CARTER, OF VERNON, TEXAS

GANG PLOW

Application filed January 31, 1928. Serial No. 250,821.

This invention has reference to agricultural machines and more particularly a machine known as a gang plow, the primary object of the invention being to provide a gang plow wherein certain plows may be reversed so that the ground may be plowed and simultaneously conditioned for planting.

Another important object of the invention is to provide a plow of this type including a plurality of independent plow beams, the plow beams being arranged in pairs, the plows of each pair being removably connected so that the blades may be changed to meet various requirements of use.

A still further object of the invention is to provide means whereby the plows will be self-cleaned or self-releasing, should they meet with an obstruction in the path of travel of the plows.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of an agricultural machine constructed in accordance with the invention.

Figure 2 is a side elevational view thereof.

Figure 3 is a sectional view taken on line 3—3 of Figure 1.

Figure 4 is an enlarged elevational view of a plow, and taken from the rear thereof.

Referring to the drawings in detail, the reference character 5 designates the front axle of the machine on which the wheels 6 are mounted, adjacent to the outer ends of the axle.

The reference character 7 designates collars that are secured to the axle 5 and against which the wheels 6 rub, to hold the wheels in proper position on the axle.

The reference character 8 designates one of the plow beams, while the numeral 9 designates the companion plow beam, both plow beams being however mounted for pivotal movement on the axle 5, there being provided bearings 10 for restricting movement of the plow beams longitudinally of the axle.

These plow beams 8 and 9 are secured together by means of the U-shaped member 11 which is secured to the beams 8 and 9 by means of the bolts 12. Associated with the beams 8 and 9, are plow beams 13 and 14 respectively which are also pivotally mounted on the axle 5 and restricted against lateral movement by means of collars 15. This pair of plow beams 13 and 14 are connected by means of the U-shaped member 16, which holds the beams 13 and 14 in proper spaced relation with each other.

The plow beam 14 is longer than the plow beam 13, to the end that the plow beams may be removed and reversed for purposes to be hereinafter more fully described.

To further insure against the plow beams 13 and 14 being moved together, a spacing bar 17 is provided adjacent to the free ends of the beams 13 and 14. As clearly shown by Figure 2, the plow beams being of the well known construction, are formed with rear curved extremities to which the plows 18 are pivotally connected.

Extending rearwardly from each plow is an arm 19 to which links 20 are pivotally connected, the links 20 lying on opposite sides of the curved portions of the plow beams. These links 20 have pivotal connection at 21 with bell crank levers 22 that are pivotally connected with the plow beams and have connection with the coiled springs 23 that also connect with the plow beams, through the medium of the members 24, to which the coiled springs are secured.

Thus it will be seen that as the plows 18 are forced into the ground surface, the springs will be placed under tension, and that when the plows meet with an obstruction, which would otherwise bend or break the plows, the springs will allow the plows to swing rearwardly and clear the obstruction, whereupon the springs will return the plows to their normal positions.

Connected with the plow beams are the bars 25 which rest on the member 26 that includes a horizontal bar spaced from the axle 5 of the machine, the forward ends of the bars 25 being connected by means of the bars 27 to which the draft appliance is connected. Thus it will be obvious that a pull directed to the members 27 will result in a downward movement of the plow beams against the action of the coiled spring to move the plow beams into the soil.

The frame of the machine is indicated generally by the numeral 28 and has pivotal connection with the upstanding bars 29 that are mounted on the axle 5, the frame being substantially triangular in formation and provided with a bearing 30 at the rear thereof in which the vertical shaft 31 of the wheel 32, supported at the rear of the machine, operates, to guide the machine.

As shown, a spring pressed pin 33 is associated with the shaft 31 and is designed to fit in a suitable opening of the shaft 31 to normally hold the shaft 31 against movement. A foot lever 34 is mounted on the frame and connects with the pin 33, through the cable 35 to the end that when the lever 34 is moved forwardly, the pin will be withdrawn to permit movement of the shaft.

Mounted on the upper end of the shaft 31 is a coiled spring 33' which has one end secured to the shaft, the opposite end thereof being secured to the bearing 30 so that the coiled spring 33' will act to normally return the wheel 32 to its initial position where it may again be locked by the pin 33.

Controlling levers 36 connect with the frame and are pivotally supported at 37, the ends of the levers 36 being supplied with springs 38 that have their lower ends connected with one of the plow beams of each pair so that as the levers 36 are raised or lowered, the plow beams will be also raised or lowered to vary the depth of operation.

Segmental racks 39 are provided and are engaged by the locking members 39' carried by the levers 36 so that the plows may be held in their positions of adjustment.

The tongue of the machine is indicated by the numeral 40, the same being connected to the axle 5 by means of the bars 41 which have their inner ends formed into bearings 42.

In the operation of the machine the machine is moved over the ground surface in the usual manner, whereupon the plows will operate to break the soil and condition it for planting.

Owing to the construction of the device it is obvious that the beams 8 and 9 may be reversed and the plows reversed, making it possible to plow and bed the ground with a single operation of the machine.

I claim:

An agricultural machine including a frame, an axle, pairs of plow beams pivotally mounted on the axle, means for connecting the plow beams of each pair, means for adjusting the plow beams vertically, said frame comprising a substantially long side bar and a short side bar, an obliquely disposed bar connecting the rear ends of the side bars, bars extending downwardly from the side bars and having connection with the axle, wheels mounted on the axle, a wheel supported at the rear of the frame, and plows supported at the free ends of the plow beams.

In testimony that I claim the foregoing as my own, I have hereto affixed my signature.

JOHN COLLINS.